(12) United States Patent
Longo et al.

(10) Patent No.: US 12,553,810 B2
(45) Date of Patent: Feb. 17, 2026

(54) SOLID CONCENTRATION DIGITAL ANALYZER

(71) Applicant: YELLOW SOLUTIONS COMERCIO, SERVICOS, CONSULTORIA E REPRESENTAÇÃO DE MAQUINAS EIRELI—ME, Americana (BR)

(72) Inventors: Paulo Longo, Americana (BR); Renan De Stefani, Americana (BR)

(73) Assignee: Yellow Solutions Comercio, Servicos, Consultoria E. Representacao De Maquinas Eireli—ME, Americana (BR)

( * ) Notice: Subject to any disclaimer, the term of this patent is extended or adjusted under 35 U.S.C. 154(b) by 326 days.

(21) Appl. No.: 18/241,354

(22) Filed: Sep. 1, 2023

(65) Prior Publication Data

US 2024/0077398 A1     Mar. 7, 2024

(30) Foreign Application Priority Data

Sep. 5, 2022 (BR) .................... 102022017790-2

(51) Int. Cl.
*G01N 9/36* (2006.01)
*G01K 7/18* (2006.01)
*G01N 9/04* (2006.01)

(52) U.S. Cl.
CPC ............... *G01N 9/36* (2013.01); *G01K 7/18* (2013.01); *G01N 9/04* (2013.01)

(58) Field of Classification Search
CPC ............ G01N 9/36; G01N 9/04; G01N 15/06; G01K 7/18
See application file for complete search history.

(56) References Cited

U.S. PATENT DOCUMENTS

| | | | |
|---|---|---|---|
| 2,995,030 | A | 8/1961 | Feigley, Jr. |
| 4,140,007 | A | 2/1979 | Bosland et al. |

(Continued)

FOREIGN PATENT DOCUMENTS

| | | |
|---|---|---|
| CN | 107589032 A | 1/2018 |
| CN | 207181204 U | 4/2018 |

(Continued)

OTHER PUBLICATIONS

English translation of DE102018122177 from worldwide.espacenet.com.*

(Continued)

*Primary Examiner* — Kristina M Deherrera
*Assistant Examiner* — Jean F Morello
(74) *Attorney, Agent, or Firm* — The Dobrusin Law Firm, P.C.

(57) ABSTRACT

The invention relates to the field of portable measuring instruments, combining mechanical and electronic means to measure the concentration of solids in a fluidic medium, as well as including means to concentrate and store a plurality of coherent data for use in different sectors, mainly commercial, industrial and laboratory; consisting of a body in the form of a box with fixing tabs, a lifting eye, an electronic board which integrates the processor circuit blocks, the 12C port circuit, the power input circuit and its connector, AD converter circuit of the load cell, slope module circuit, temperature sensor circuit collected via the input connection, circuit of the record button and tare button of the HMI/display and recording module and its USB input connection.

8 Claims, 12 Drawing Sheets

(56) References Cited

U.S. PATENT DOCUMENTS

| | | |
|---|---|---|
| 11,340,150 B2 | 5/2022 | Maldonado Saavedra et al. |
| 2010/0156409 A1 | 6/2010 | Nikolin et al. |

FOREIGN PATENT DOCUMENTS

| | | | |
|---|---|---|---|
| DE | 102018122177 A1 * | 3/2020 | ............... G01N 5/02 |
| EP | 3070531 A1 | 9/2016 | |
| GB | 1410954 A | 10/1975 | |
| GB | 2232902 A | 1/1991 | |

OTHER PUBLICATIONS

Maxx DP (https://www.msinstrumentos.com.br/home/index.php/balanca-de-polpa/) (2018).

https://www.msinstrumentos.com.br/max-dp-balanca-para-densidade-de-polpa-com-indicacao-digital/ MS Instruments, Apr. 17, 2018, Max DP.

* cited by examiner

SOLID CONCENTRATION DIGITAL ANALYZER

FIELD OF INVENTION

More particularly, the present Invention relates to a portable measuring device that combines mechanical and electronic means to measure the concentration of solids in a fluidic medium.

This analyzer, in addition to accurately measuring the concentration of solids, also has means for collecting various data related to its main function, such as: date, time, operator, tag, mass, density, temperature, x-slope, y-slope, k-mass, k-volume and grain density.

This solids concentration digital analyzer provides the means to concentrate and store a plurality of coherent data for use in different sectors, mainly commercial, industrial and laboratory.

PRIOR ART

There are currently numerous devices for analyzing the concentration of solids in a fluidic medium, as taught, for example, in the documents: CN107589032, CN207181204, EP3070531, GB1410954, GB2232902, U.S. Pat. Nos. 2,995,030, 4,140,007, 11,340,150 and US20100156409. These devices, although developed for measuring the percentage of solids, have their own particularities and are usually specific to certain fields of application, as well as not having the means to collect different data in a single device, making them of limited use for specific applications.

On the other hand, there are also analog devices for measuring the concentration of solids, such as the traditional Marcy Scale, which is completely mechanical, i.e. it combines a mechanical pointer scale that moves over a chart-shaped dial, where different concentric scales are combined for visual analysis of the data: a) weight of the sample in grams or kilograms, b) specific gravity of the liquid or pulp, c) percentage of solids contained in the pulp of any specific gravity and d) specific gravity of dry solids. It is therefore an archaic process whose accuracy depends very much on the skill of the operator, and so this type of device usually makes parallax errors and other errors possible, making it unsuitable for use in certain sectors where precision in measurement is required.

Another well-known measuring device is a kind of pulp scale, known as the MAXX DP (www.msinstrumentos.com.br/home/index.php/balanca-de-polpa/). Although this scale suggests replacing the mechanical Marcy scale, it does not fulfill this function. It is just an ordinary scale that uses the artifice of a 1 (one) liter container. Density=Mass/Volume, so considering that the volume is one liter, dividing by one will result in the density of the pulp. It is therefore up to the user to carry out the calculation shown above, on their own, to get the value of the percentage of solids (% S). It has no digital processing, data logger or any possible means of communication interface.

Purposes of the Invention

A portable solids concentration digital analyzer that combines mechanical and electronic means to measure the percentage of solids in a fluidic medium.

In addition to accurately measuring the percentage of solids, it is also a purpose of the invention to provide means for collecting various data related to its main function, such as: date, time, operator, tag, mass, density, temperature, x-slope, y-slope, k-mass, k-volume and grain density.

Another purpose of the analyzer is to provide the means to concentrate and store a plurality of data and generate a log report of the instrument's events. The log is generated and recorded directly on a data storage system, such as: EEPROM memory, USB-PENDRIVE, USB-HD, SD CARD, including different communication protocols: modbus (RTU-TCP/IP-Proprietary), profibus PA/DP, fieldbus, ethernet, ethercat, profinet, device net, can open, hart, IOT, OPC, AS-interface, controlnet, interbus, sercos III, varan, IEC61850, wifi and bluetooth.

The purpose of the invention is also to create a device with a broad field of application, i.e. one that contains all the necessary information for the set to be used in commercial, industrial and laboratory sectors, such as: mining, steel industry, metallurgy, fertilizers, sugar and alcohol, food, laboratories in general, pulp and paper, fuel distribution terminals, petrochemical, oil and gas, refineries, chemical, pharmaceutical, cement, automotive, sanitation, energy, construction, agribusiness, textile, shipping, thermoelectric, naval, defense, beverages and others.

DESCRIPTION OF THE DRAWINGS

For a better understanding of the present Invention, a detailed description of it is given below, with reference to the attached drawings.

FIG. 01 shows the analyzer from a perspective at an anterosuperior angle, highlighting its external details.

FIG. 02 also shows the analyzer from a perspective, but at a posterosuperior angle, detailing other external details.

FIG. 03 is an exploded perspective showing the analyzer at an anterosuperior angle, detailing its internal and external parts.

FIG. 04 is also an exploded perspective view, but showing the analyzer at a posterosuperior angle, detailing its internal and external parts.

FIG. 05 shows the analyzer according to a front elevation view with the "A-A" cut indicated.

FIG. 06 shows a side view over the "A-A" cut line, with the "B-B" cut also indicated in this view.

FIG. 07 is a view of the "B-B" cut.

FIG. 08 shows a view of the general diagram of the electronic board and the blocks that make up the analyzer's electronic circuits.

FIG. 09 shows a schematic of the temperature sensor circuit's electronic circuit/blocks.

DETAILED DESCRIPTION OF THE INVENTION

Figure 1:
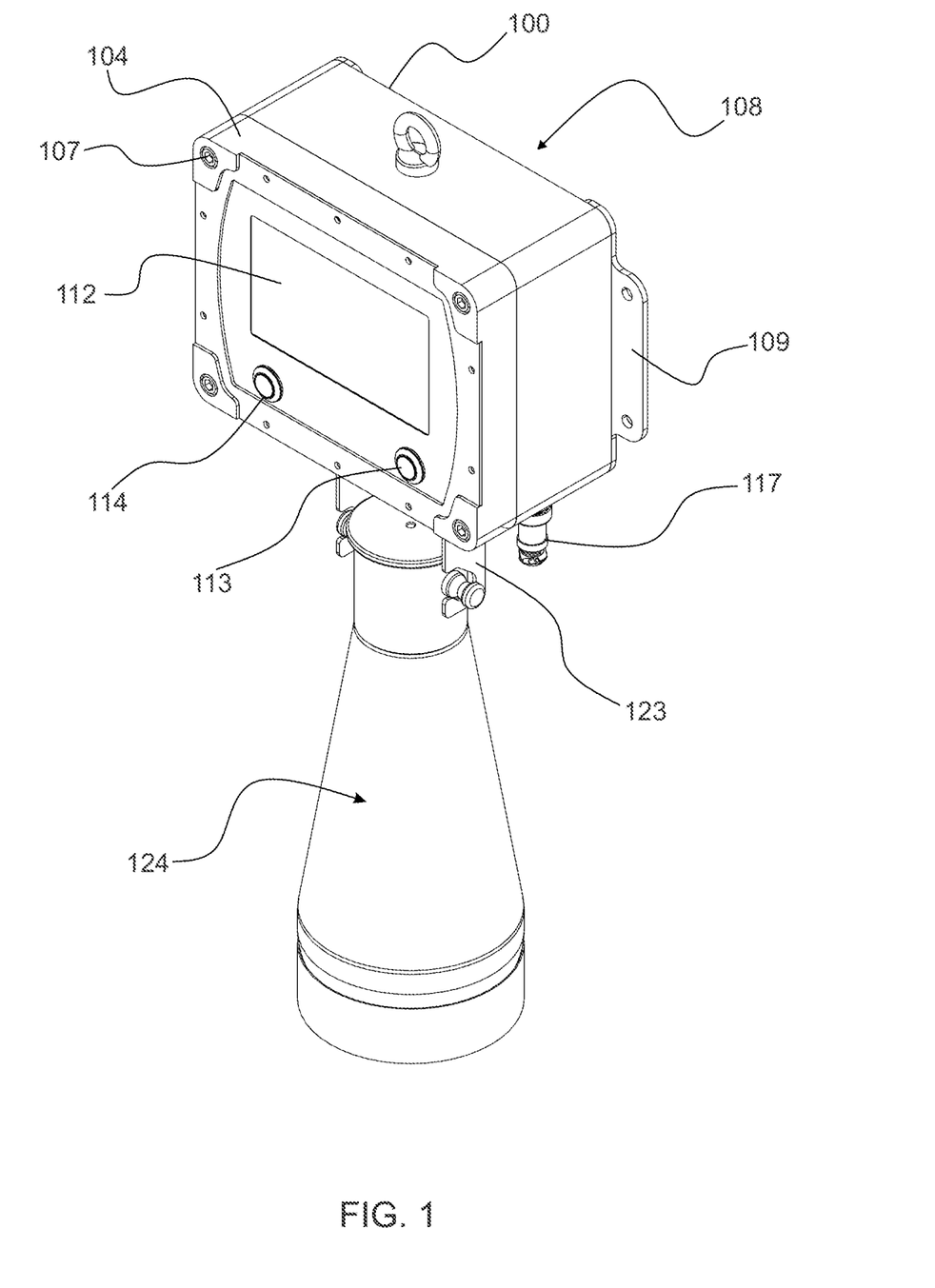
Figure 2:
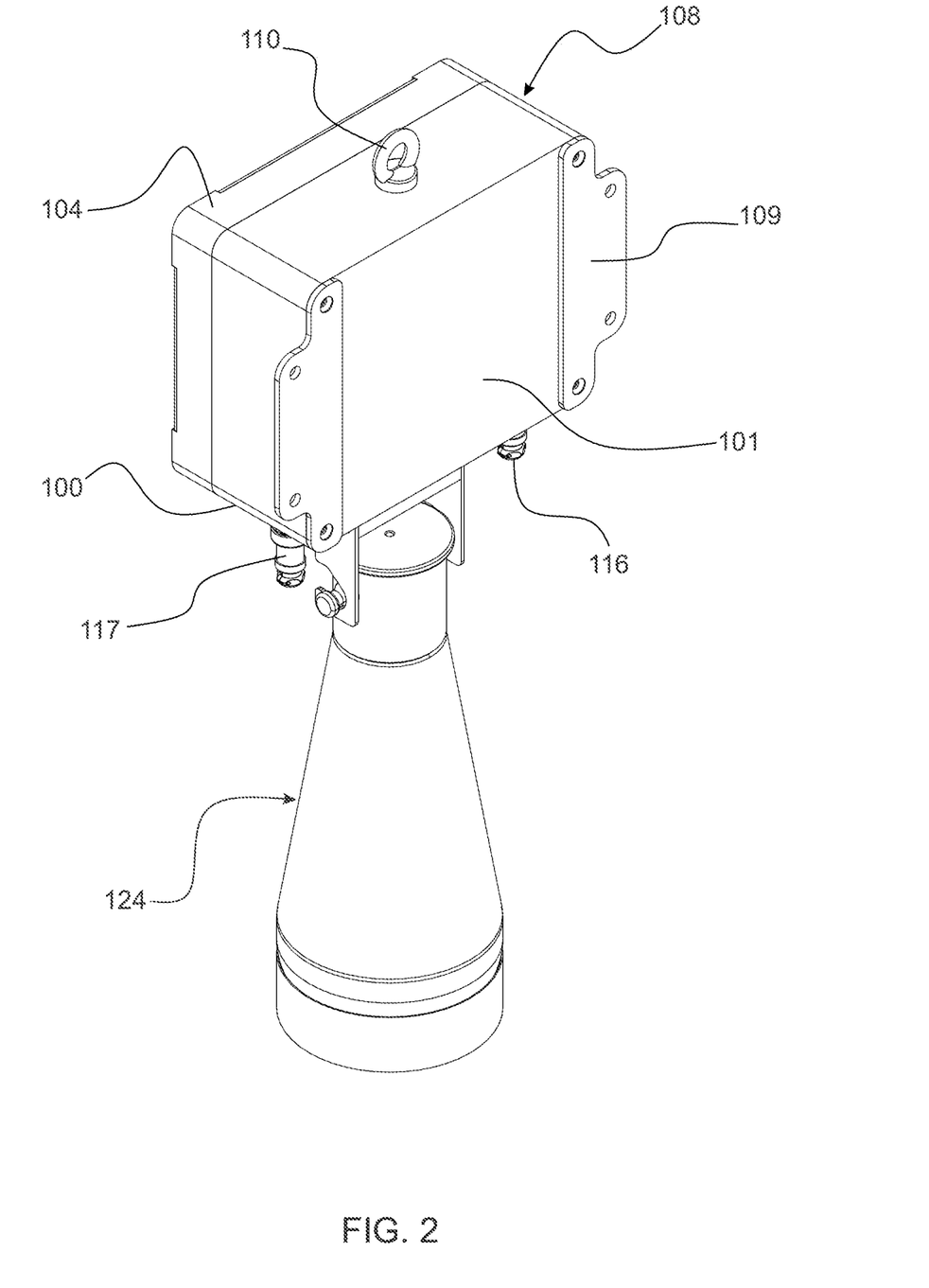
Figure 3:
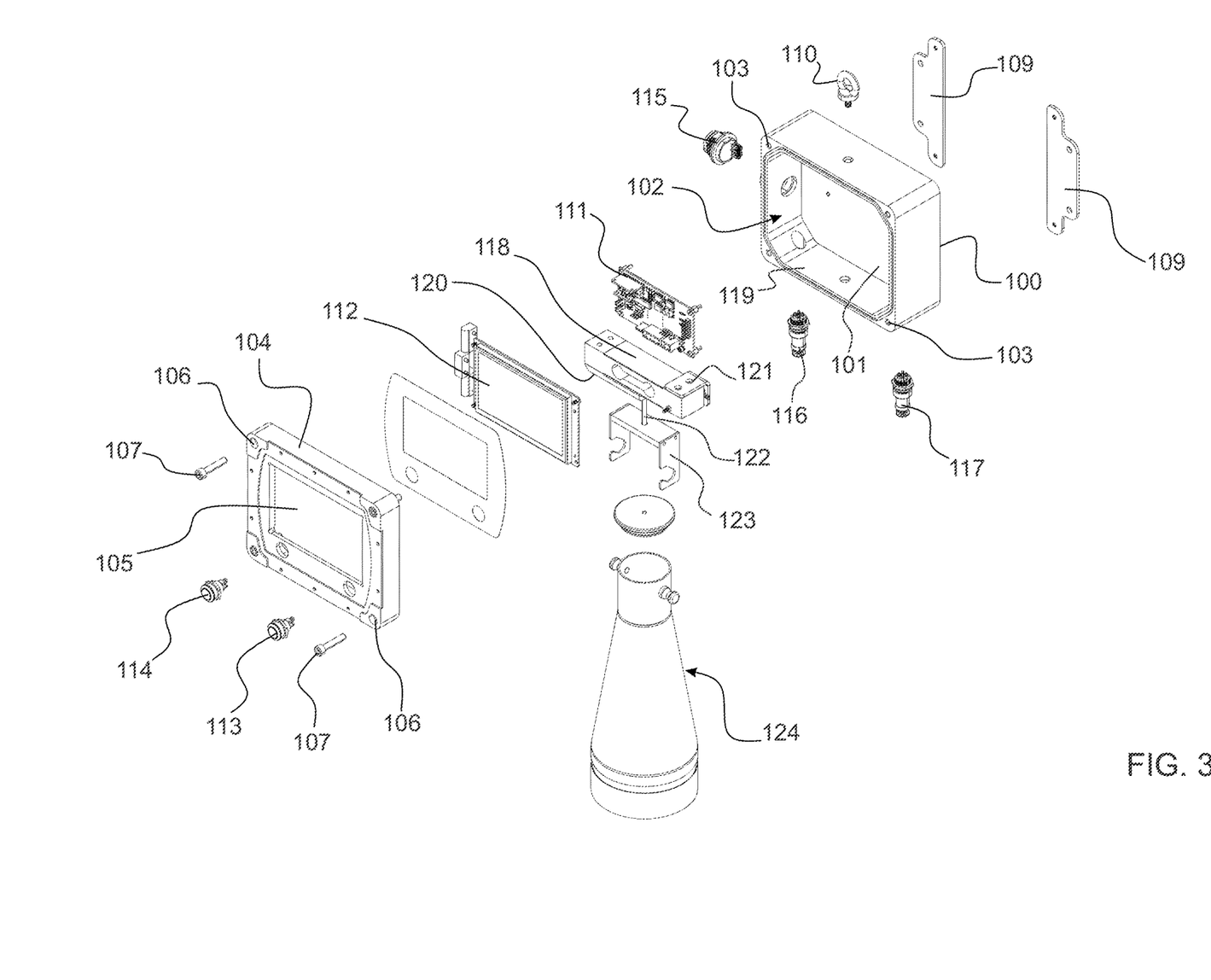
Figure 4:
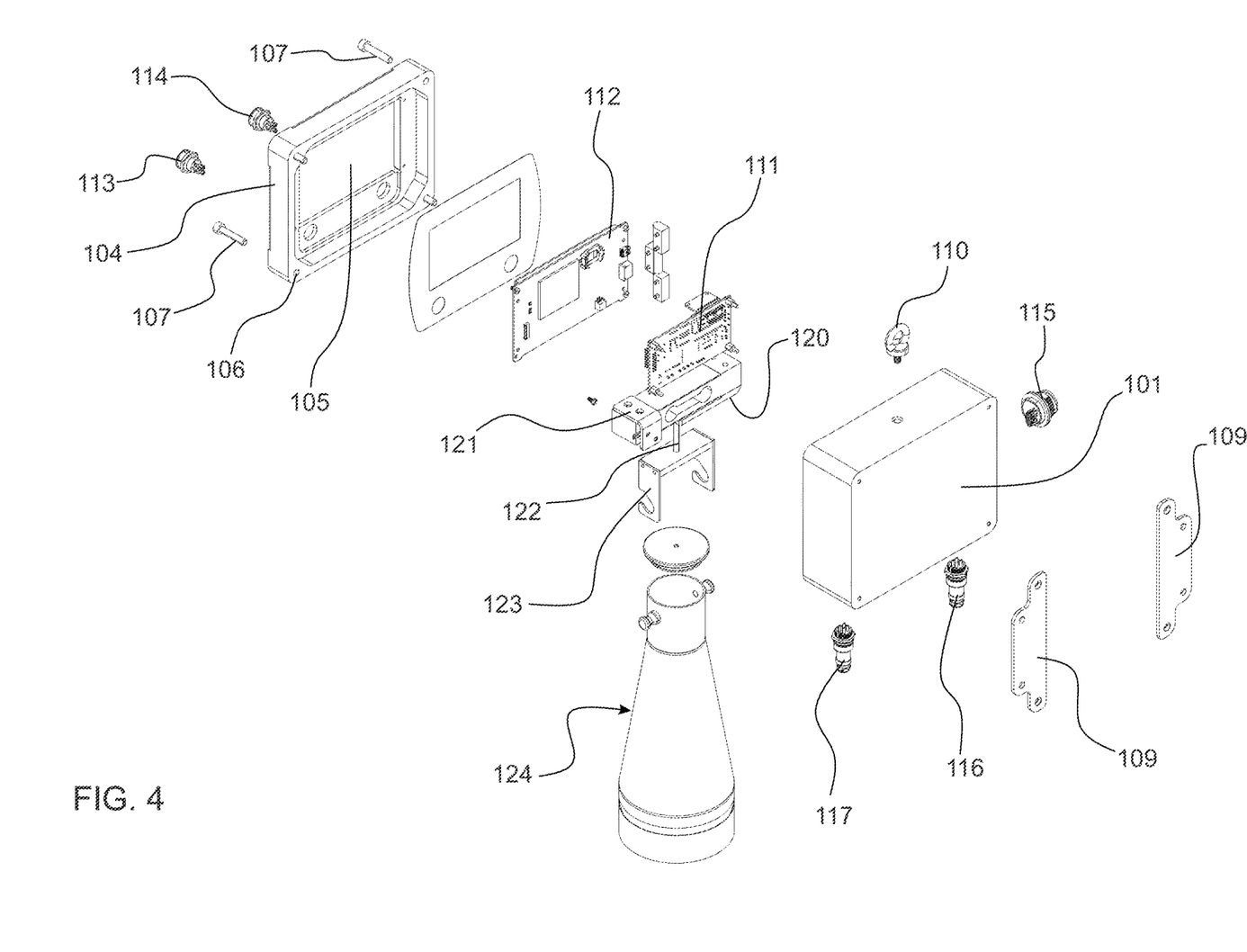
Figure 5:
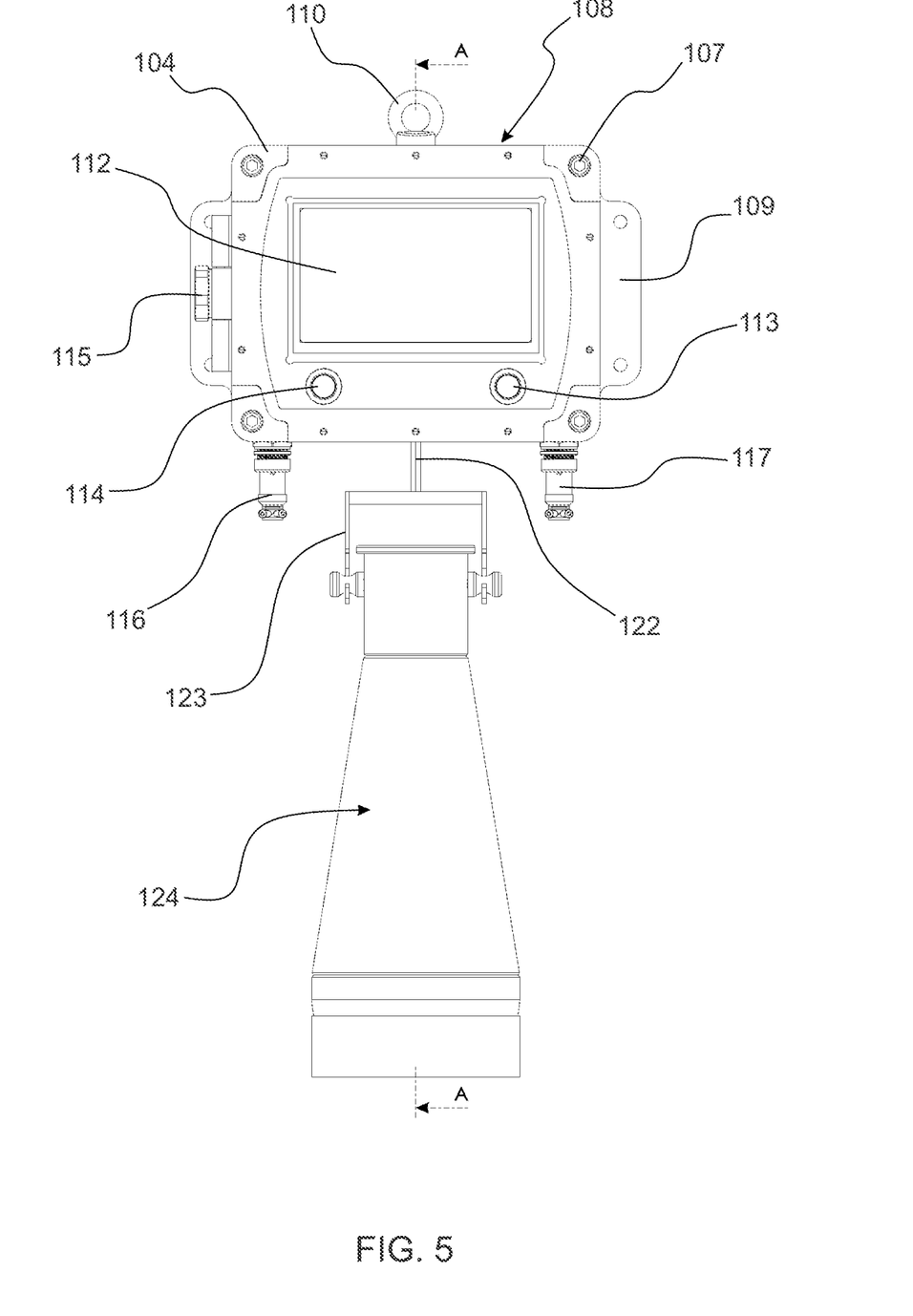
Figure 6:
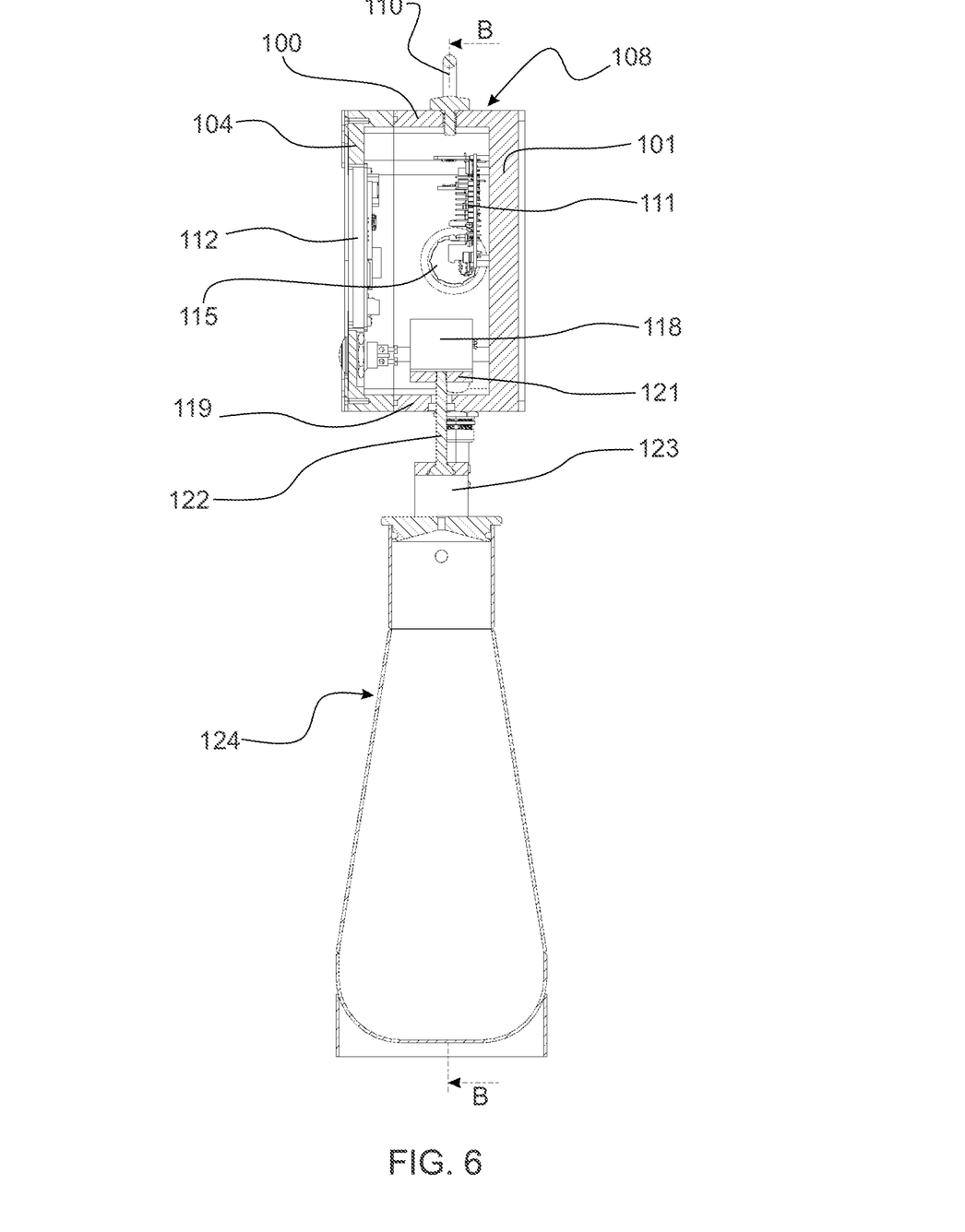
Figure 7:
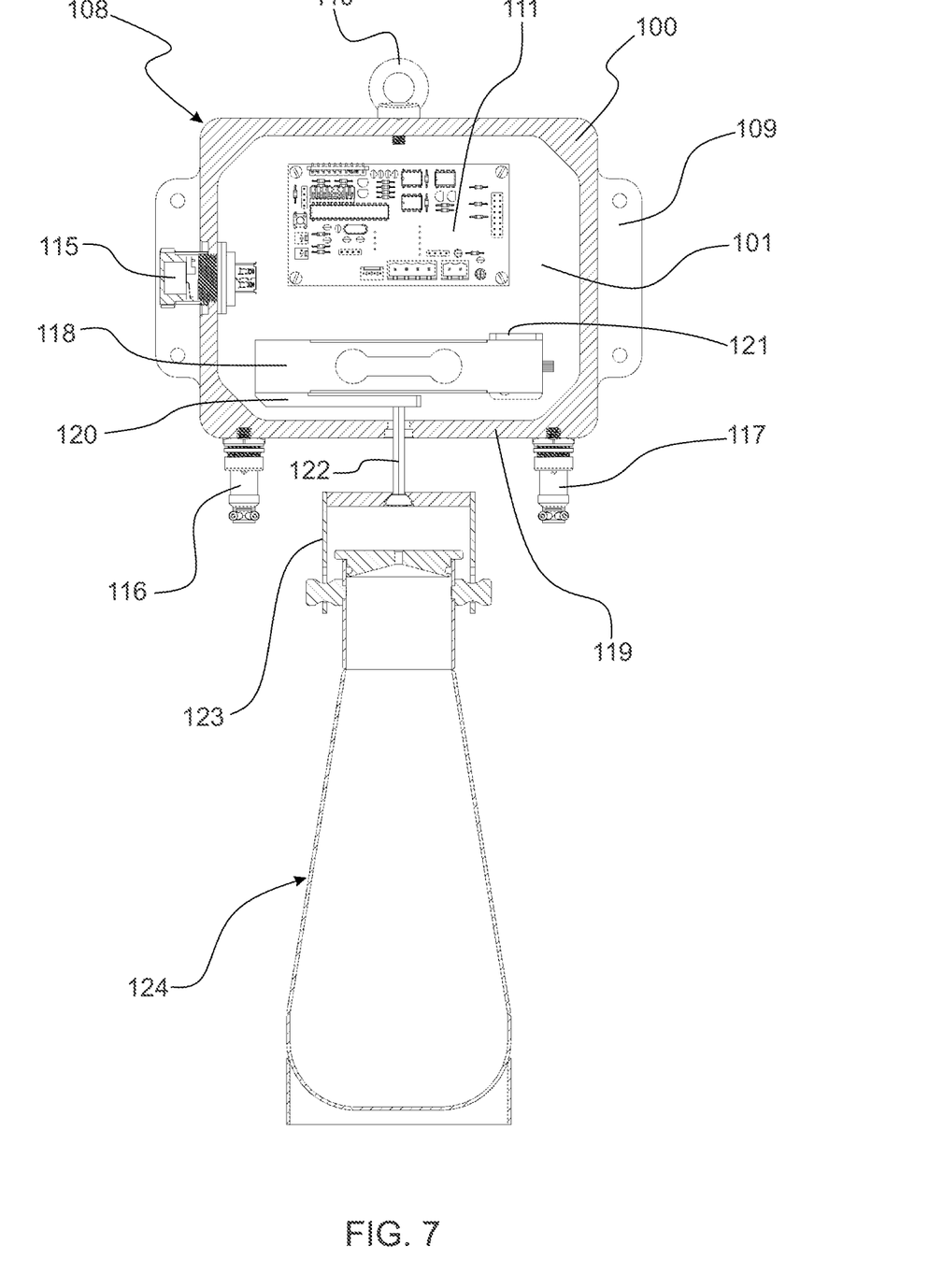
Figure 8:
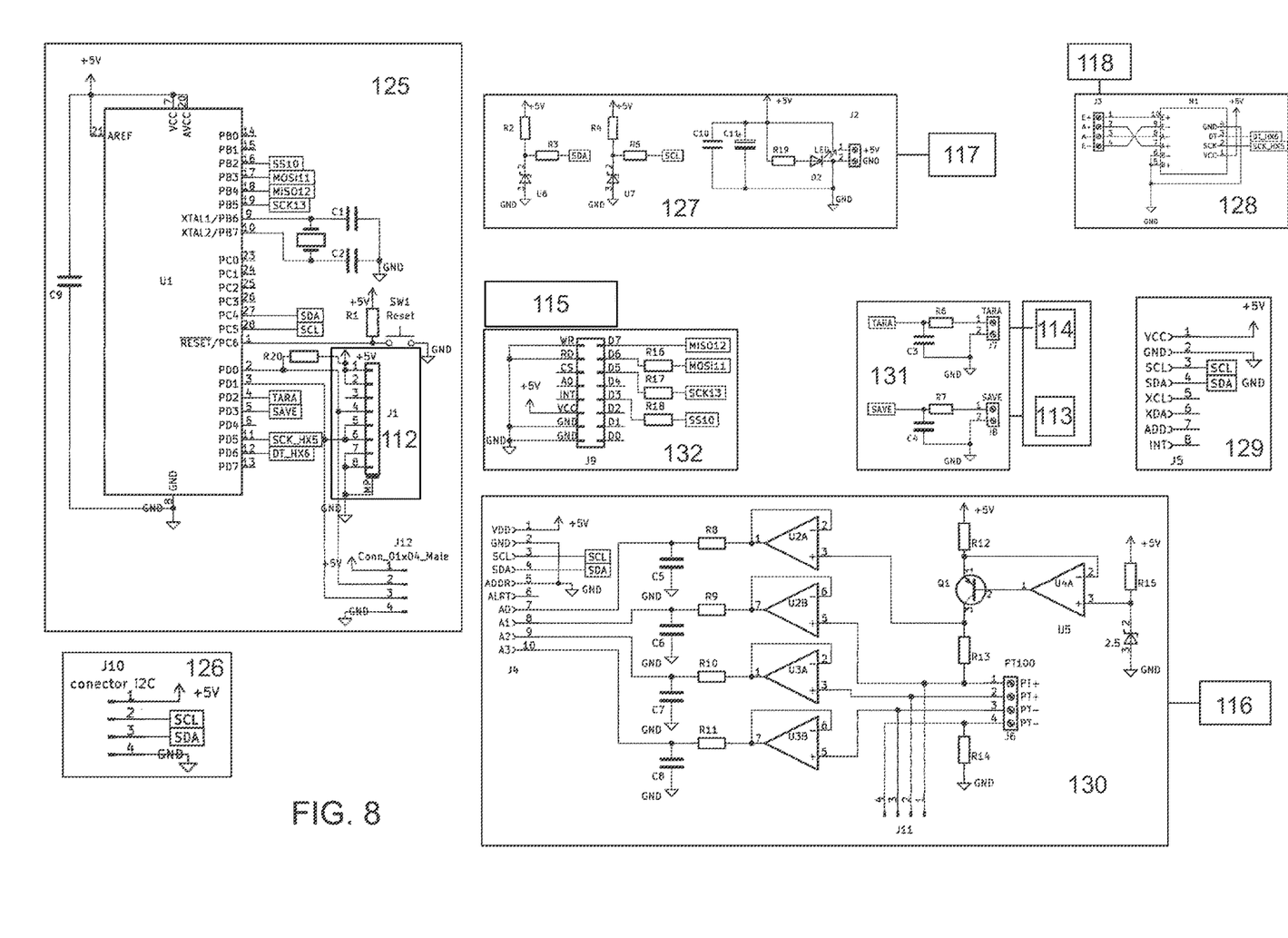

According to these illustrations and their details, more particularly FIGS. 1 to 7, the present invention, percentage solids digital analyzer, comprises:

a body (100), molded in aluminum, with an ordinarily parallelepipedal shape with a rectangular base, having its rear part closed by a bottom (101), while its front part is completely open (102) with threaded holes (103);

a front cover (104) in the form of a frame and thus forms a wide central opening (105), as well as including holes (106) and screws (107) for fixing to the corresponding threaded holes (103) in the body (100), configuring a box (108) for mounting all the internal and external components, finalizing a portable set to be used in different locations or, if necessary, it can be used in a fixed way in any location;

the body (100) has at least two tabs (109) and a lifting eye (110), where the former are fixed to the back of the body (100), one on each side, both with holes that form fixing points for the set in any location, mainly on a panel, while the aforementioned lifting eye (110) is fixed to the upper wall of the body (100), where it serves to facilitate the portability of the device when it is used in different locations;

an electronic board (111) mounted inside the body (100) of the box (108) and against the bottom (101), where said electronic board (111) constitutes the hardware responsible for all the logical level processing and reading of the peripherals involved, which will deliver all the data flow and take care of calculations and communication;

said electronic board (111), in addition to the on-board software, integrates the HMI/display circuit (112) and the respective record button (113) and tare button (114), both mounted on the underside of the frame cover (104) of the body (100), as well as a USB port (115) on the side, a lower input connector (116) for the temperature sensor circuit, a lower input connector (117) for the power supply and load cell (118), the latter is arranged on the lower wall (119) and fixed to the back wall (101) of the body (100) by means of a lower support (120) and an upper support (121), to the former of which is attached the upper end of a pendulum weighing rod (122) which, after passing freely through the wall (119), has its lower end hingedly fixed to a double hook (123), to which the stainless steel pycnometer (124) is attached;

said electronic board (111), as shown in FIG. 8, integrates the blocks of the processor circuit (125), the I2C port circuit (126), the power input circuit (127) and its connector (117), the AD converter circuit (128) of the load cell (118), slope module circuit (129), temperature sensor circuit (130) collected via the input connection (116), record button (113) and tare button (114) circuit (131) of the HMI/display (112) and recording module (132) and its USB input connection (115).

Figure 9:
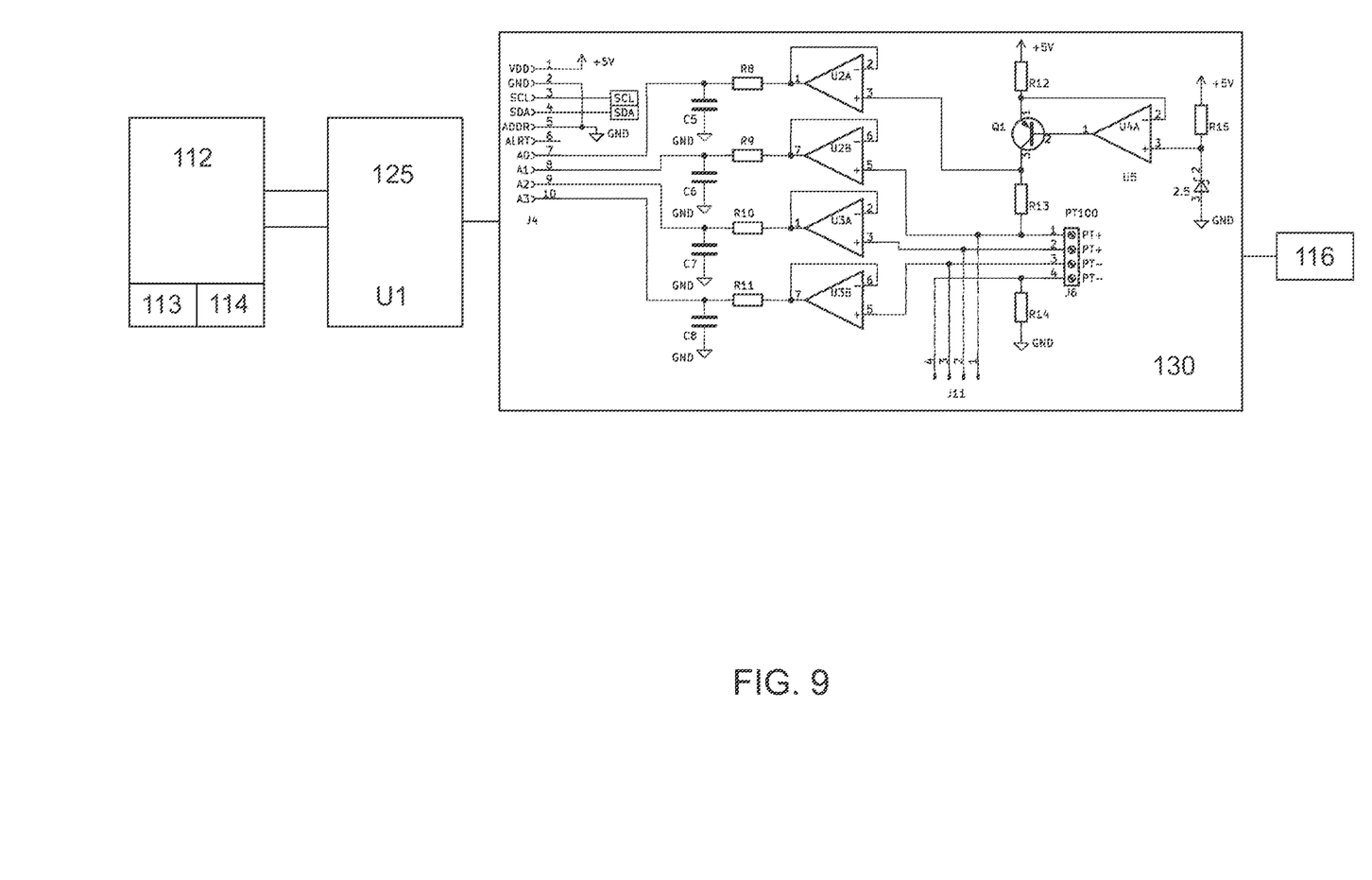

The temperature sensor circuit (130), illustrated in FIG. 9, is responsible for reading the temperature of the pycnometer (124) (sample) in order to send the temperature to the controller for volumetric correction by correcting the specific mass/% of solids. The temperature sensor circuit (130) is of the type with the means to select the pt-100 sensor model to be coupled to the connection (116) via the jumpers (j11) with 2-wire, 3-wire, 4-wire connection bridges, so that the signal from the temperature sensor circuit (130) can enter resistively through the AMPOP signal amplifier circuit (U2A, U2B, U3A, U3B and U4A), which is set to a fixed current as well as a known voltage. This resistance input caused by the pt-100 at input (116) generates a change in this current. The changed current is measured and transformed into temperature by the processor (U1). The processor will process this temperature and apply the necessary filters for stabilization. After the filters, the variable is sent and shown on the HMI/display (112), where the record button (113) saves the detected temperature, as well as the other variables: date, time, operator, tag, mass, density, temperature, x-slope, y-slope, k-mass, k-volume and grain density.

Figure 10:
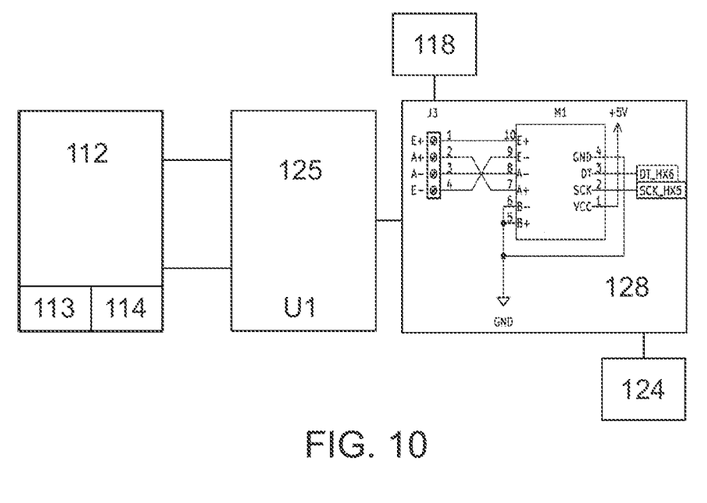
FIG. 10 shows the electrical circuit/blocks for reading the load cell-analog converter.

As shown in FIG. 10, the load cell (118) is essential for obtaining the load applied to the analyzer, where it correlates the density measurement as a function of the known volumetry of the pycnometer (124) and equates the % of solids, which is done in conjunction with the AD converter circuit (128), microprocessor (125) and HMI/display (112), i.e. in the presence of stress on the load cell (118), its internal resistive bridge is modulated. This change in the resistive bridge (MI) is picked up by the digital analog converter (128), which converts the analog signal from the load cell into digital format, using the circuit mentioned above. The U1 processor fetches the information from the load cell (118) from the digital analog converter (128) and performs data processing on this digital signal so that it can be converted into a standardized signal (Mass). The U1 processor uses the mass information in the calculation of the density algorithm mentioned below to get the density value. Once the density has been obtained, the value is sent to the HMI/display (112). This density is also used to calculate the % of solid according to the % of solid calculation mentioned above. The % of solid value is sent to the HMI/display circuit (112), where with a simple press of the record button (113) the operator records all the variables in Log format (data), as well as all the variables mentioned above: date, time, operator, tag, mass, density, temperature, x-slope, y-slope, k-mass, k-volume and grain density.

Figure 11:
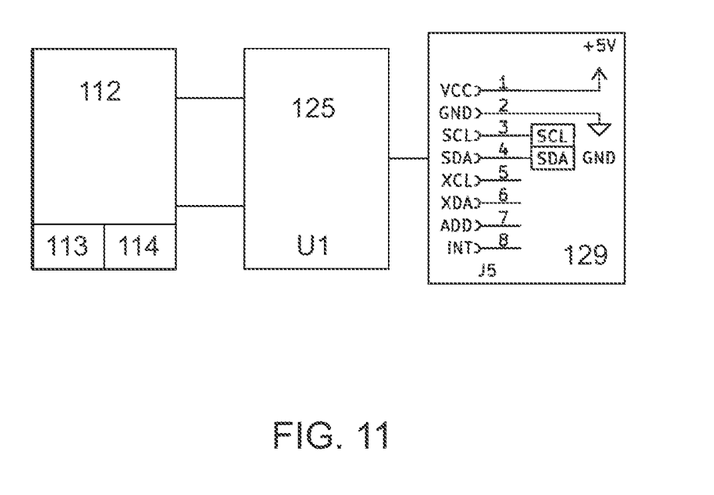
FIG. 11 shows the electrical circuit/readout blocks for the tilt sensor.

The slope module circuit (129) is illustrated in FIG. 11, which shows the flowchart of the tilt sensor, which is a standard module, where it returns the variable as a ±32-bit digital signal depending on the X, Y, Z slope. The sensor (J5) reads the slope and sends the digital signal (j5) to the processor (U1), where the raw signal is analyzed by the U1 processor, processed and filtered, after which it is sent to the HMI/display (112) and made dynamically available to the operator. This signal is recorded (j9) when the operator presses record on the HMI/display screen or the record button (113), as well as all the variables mentioned above: date, time, operator, tag, mass, density, temperature, x-slope, y-slope, k-mass, k-volume and grain density.

Figure 12:
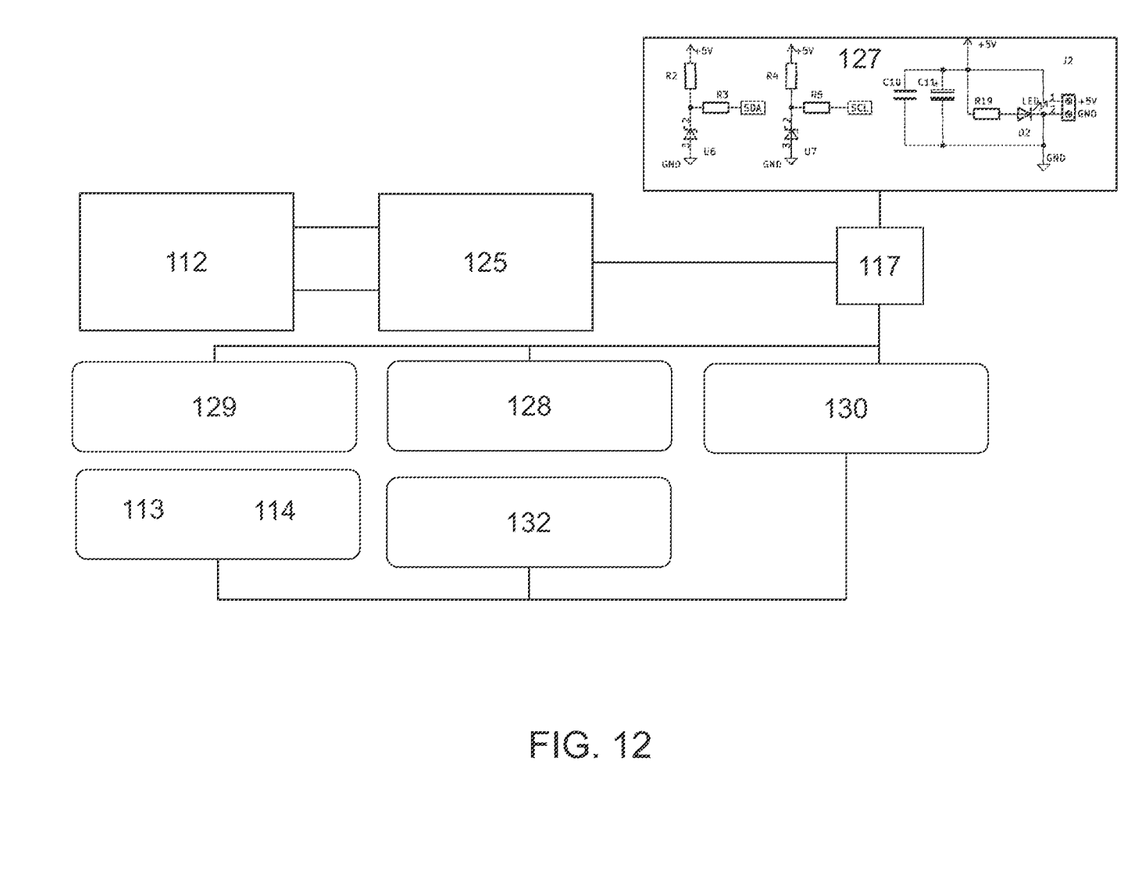
FIG. 12 shows the electrical circuit/blocks of the 5-volt power supply system.

FIG. 12 illustrates the flowchart of the power input circuit (127), where it can be seen that it is a power supply circuit with a 5-volt input, standardized by a conventional market source, or a battery such as a power bank (J2) against reverse polarity acting on the signals. The capacitors (C10 and C11) act as a noise filter to ensure the stability of the electronic circuit. After this, it passes through the voltage distribution bridges (J2) and feeds the entire bus (the entire circuit is fed by this input, as shown in the diagram in FIG. 8).

Figure 13:
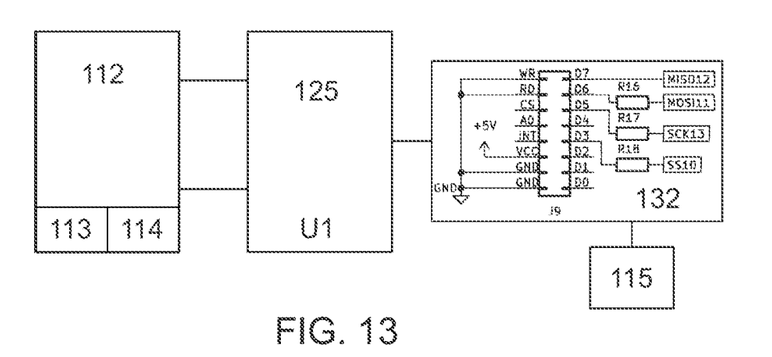
FIG. 13 is the electrical circuit/blocks detailing the data storage module.

FIG. 13 shows the data storage flowchart for the recording module (132). This processing is also done with a standard module. The module (J9) has SPI communication with the U1 processor. The communication bus leaves all data traffic open for the generated signals (J9). All the variables generated by the instrument are sent to this module (J9), where it writes them to the USB port (115) connected to a pendrive. If the USB port (115) does not recognize the memory, it sends a signal to the U1 processor, which sends a communication variable to the HMI/display (112). In the opposite situation, the following data is stored: date, time, operator, mass, density, percentage of solids, temperature, x-slope, y-slope, mass calibration factor, pycnometer calibration factor, grain density imputed by the operator to make up the calculation base, after recording all this, it starts the scanning process to return to the beginning.

Figure 14:
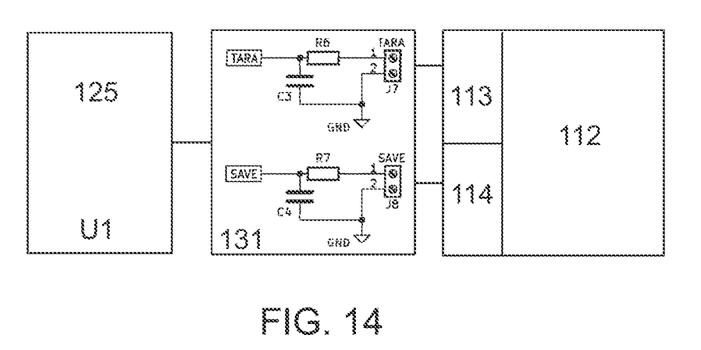
FIG. 14 is a view of the electrical circuit/blocks for the tare and record buttons.

FIG. 14 illustrates the flowchart of the circuit (131) of the record button (113) and the tare button (114), both of which have the simple function of sending a pulse to the U1 processor. Clicking on the record button (113) or tare button (114) closes the contact with the U1 processor and the resistors in parallel (R6 and R7) act as a filtering system for voltages that could generate anomalies in the processor (U1). When open, the processor (U1) understands the pulse and executes the tare or record function. Functions already established in the routines of each of the processes (U1).

Figure 15:
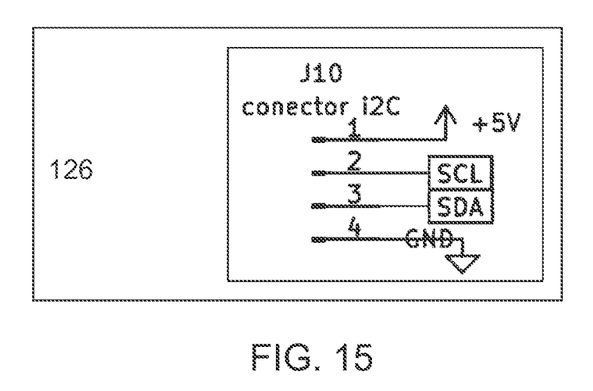
FIG. 15 shows a view of the electrical circuit/blocks of the proprietary protocol for integration between industrial systems.

FIG. 15 shows the circuit flowchart for port 12C (126) for IO/Communication a proprietary protocol circuit for integration between industrial systems. This circuit is part of the data processing. The I2C port (j10) is a communication protocol for hardware expansion that allows boards to communicate with each other in master and slave mode. This system is just a bus flowchart, where the entire signal travels across the network, and when it finds the node it is supposed to communicate with, it does so. Port 12C (126) can be used to communicate with all the following protocols: modbus RTU, modbus TCP/IP, proprietary modbus, profibus PA/DP, fieldbus, ethernet, ethercat, profinet, device net, can open, hart, IOT, OPC, AS-interface, controlnet, interbus, sercos III, varan, IEC61850, wifi and bluetooth.

The Operation of the Analyzer Consists of:
a) taking a sample of the pulp with the pycnometer (124);
b) measuring the temperature with the PT 100 temperature sensor circuit (130);
c) placing the lid on the pycnometer (124) to close it accurately;
d) placing the filled and closed pycnometer at the sampling point (123);
e) waiting for the mass to stabilize;
f) using it to measure density and % of solids;
g) pressing the record button (113); and
h) starting the cycle for new sampling.

Applied Mathematical Models

Calculation of Density $$D = \frac{m}{v}$$

D=Density
m=Mass
v=Volume

Calculation of Volumetric Expansion $\Delta V = V_0 \cdot \gamma \cdot \Delta T$ $\Delta V$=Volumetric variation
$V_0$=Initial volume
$\gamma$=liquid expansion coefficient
$\Delta T$=temperature variation Calculation of Actual Volumetric Expansion $\Delta v_{real} = \Delta V_{rec} + \Delta V_{Ap}$ $\Delta v_{real}$=Actual volumetric variation
$\Delta v_{rec}$=Vessel volumetric volume
$\Delta V_{Ap}$=Apparent volumetric variation Calculation of Percentage of Solids $$(\% \text{ solid}) = 100 \cdot \frac{\varphi_{\int_0^{Msol} - \sqrt{-x^2+r^2+dx)}\int_0^m a2xdx + \int_{m1}^r \sqrt{-x^2+r^2+dx)}}^{Msol}(\rho_\varphi - \rho_{ref})}{\rho_\varphi \left(\varphi_{\int_0^{Msol} - \sqrt{-x^2+r^2+dx)}\int_0^m a2xdx + \int_{m1}^r \sqrt{-x^2+r^2+dx)}}^{Msol} - \rho_{ref}\right)}$$

Calculation of Area of the Semicircle as a Function of the Total Area of the Circle $\int_0^m - \sqrt{-x^2+r^2+dx)} \int_0^m a2 \times dx + \int_{m1}^r \sqrt{-x^2+r^2+dx)}$ The instrument is also able to electronically validate the mechanical installation, informing us whether it is in line with the minimum operating parameters.

The solids analyzer will also correct for the fluid's volumetric expansion, so it is possible to correct for density and % of solids corrected to a fixed temperature base.

The invention claimed is:

1. A SOLIDS CONCENTRATION DIGITAL ANALYZER, comprising:
    a body with a parallelepiped shape with a rectangular base, having its rear part closed by a bottom, while its front part is completely open with threaded holes;
    front cover in the form of a frame with a wide central opening, as well as including holes and screws for fixing to the corresponding threaded holes in the body, configuring a box;
    at least two tabs and a lifting eye, where the former are fixed to the rear side of the body one on each side, both with holes that form fixing points for the assembly in any location, while the aforementioned lifting eye is fixed to the upper wall of the body;
    an electronic board mounted inside the body of the box and against the bottom; and
    said electronic board, in addition to an embedded software, integrates the circuit of an HMI/display and its respective record button and tare button, both mounted on the underside of the frame-type cover of the body, as well as said board is interconnected with a USB port, on the side, a lower input connector for a temperature sensor circuit, a lower input connector for an electrical power supply and load cell, the latter is arranged on the lower wall and fixed to the back wall of the body by means of a lower support and an upper support, to the former of which is attached the upper end of a pendulum weighing rod which, after passing freely through the wall, has its lower end hingedly fixed to a double hook, to which the stainless steel pycnometer is attached.

2. The SOLIDS CONCENTRATION DIGITAL ANALYZER according to claim 1, wherein the electronic board integrates blocks for each of a processor circuit, 12C port circuit, power input circuit and its connector, AD converter circuit of the load cell, slope module circuit], temperature sensor circuit collected via the input connection, circuit of the record button and tare button of the HMI/display and recording module and respective USB input connection.

3. The SOLIDS CONCENTRATION DIGITAL ANALYZER, according to claim 2, wherein the temperature sensor circuit reads the temperature of the pycnometer (sample) and sends this signal to the processor circuit for volumetric correction by correcting the specific mass/% of solids; said temperature sensor circuit is of the type with means for selecting a pt-100 sensor model to be coupled to the connection via the jumpers (j11) with 2-wire, 3-wire, 4-wire connection bridges, so that the signal from the temperature sensor can enter resistively through a AMPOP signal amplifier circuit (U2A, U2B, U3A, U3B and U4A), which is set to a fixed current as well as a known voltage; this resistance input caused by the pt-100 on input generates a change in this current, which is transformed into temperature form by a processor (U1) and shown on the HMI/display, where the record button saves the detected temperature as well as the other variables.

4. The SOLIDS CONCENTRATION DIGITAL ANALYZER, according to claim 2, wherein a processor (U1) searches the information from the load cell in the digital analogue converter and performs data processing of this digital signal so that it is converted into a standardized signal (Mass), wherein this information is used to calculate the density algorithm to get the density value, which is then sent to the HMI/display, as well as being used to calculate the % of solid which is sent to the HMI/display circuit and, via the record button, all the variables are recorded in Log format (data).

5. The SOLIDS CONCENTRATION DIGITAL ANALYZER, according to claim 2, wherein the circuit of the slope module of the X, Y,Z slopes performs the reading of the slope through a sensor (J5) and sends the signal to a processor (U1), where the signal is analyzed and sent to the HMI/display where it is dynamically available to the operator and for recording.

6. The SOLIDS CONCENTRATION DIGITAL ANALYZER according to claim 2, wherein all data generated is stored in the recording module, wherein the module has an SPI communication with the processor (U1).

7. The SOLIDS CONCENTRATION DIGITAL ANALYZER, according to claim 2, wherein the circuit of the record button and the tare button, when closed, send pulses to the processor (U1) and two resistors in parallel (R6 and R7) that work with a voltage filtering system that can generate anomalies in the processor (U1) and, when open, the processor (U1) understands the pulse and performs the tare or record function.

8. The SOLIDS CONCENTRATION DIGITAL ANALYZER, according to claim 2, wherein the circuit of port 12C is a communication protocol for hardware expansion in master and slave mode of boards with each other.

* * * * *